INVENTOR.
THOMAS KARMANN
BY
Cushman, Darby & Cushman
ATTORNEYS

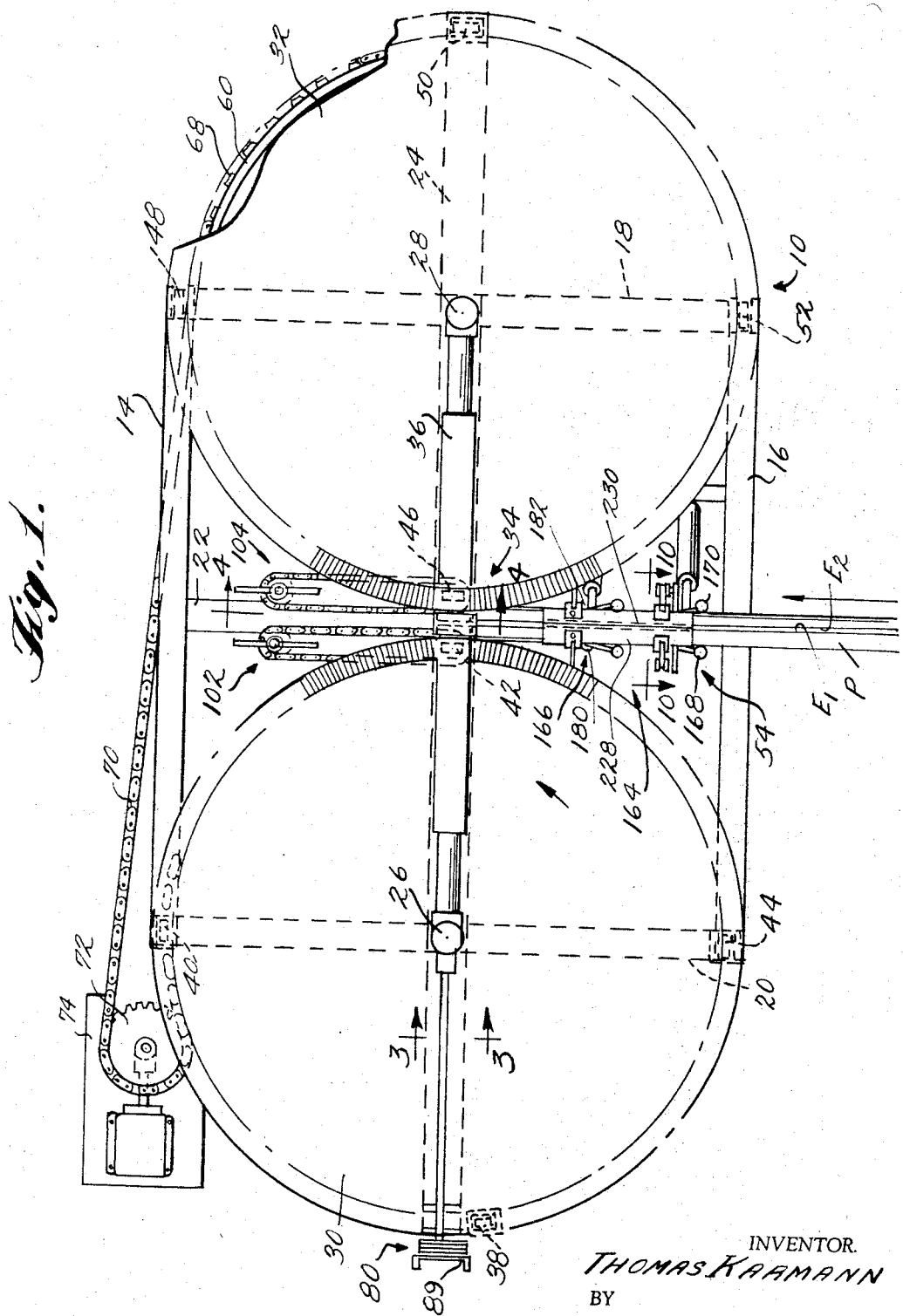

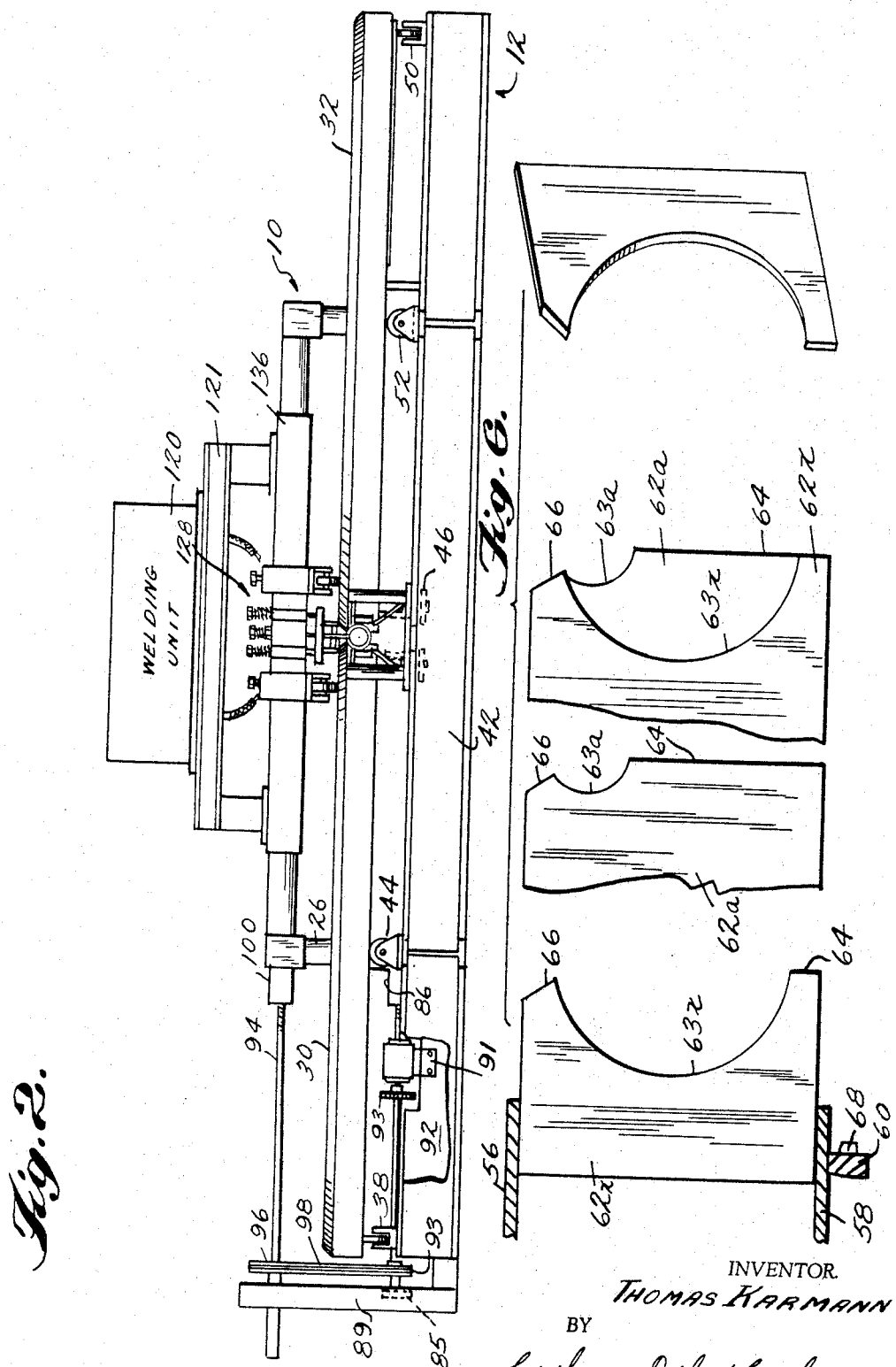

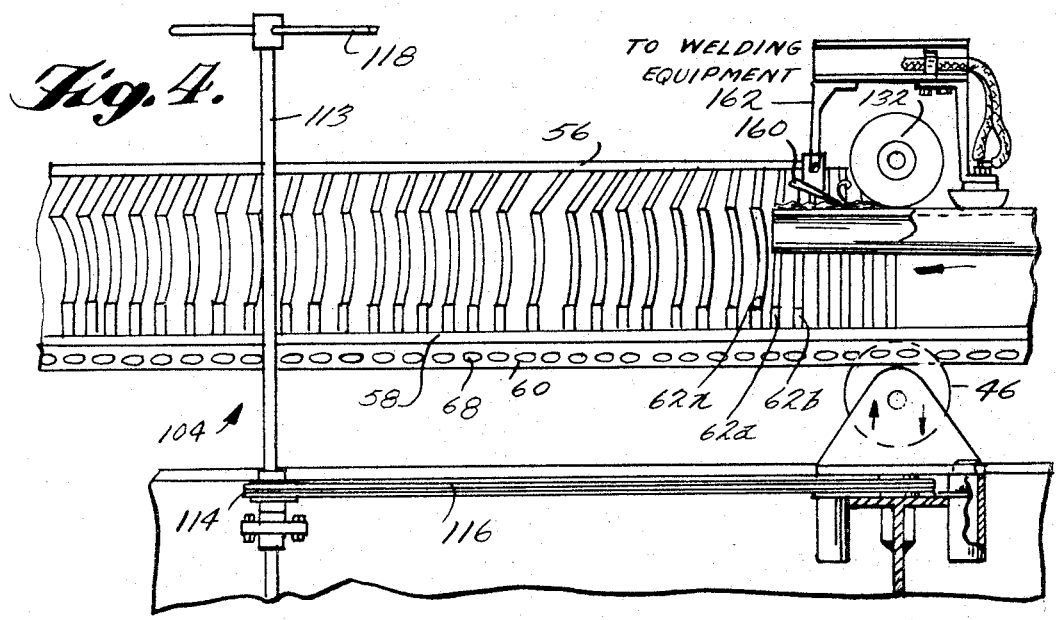
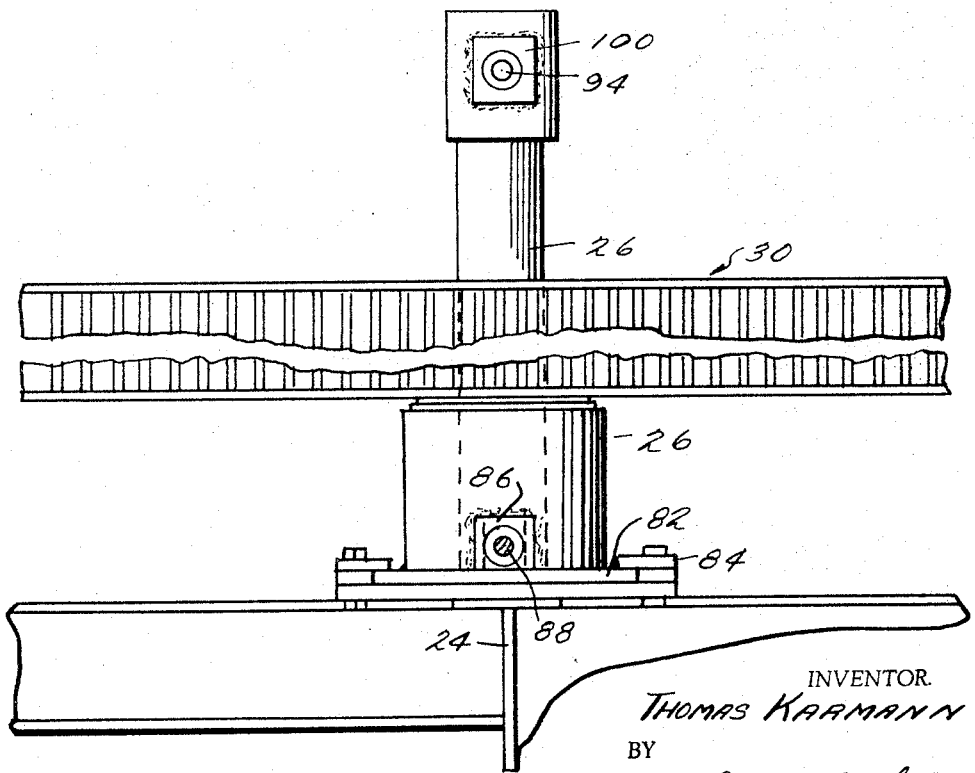

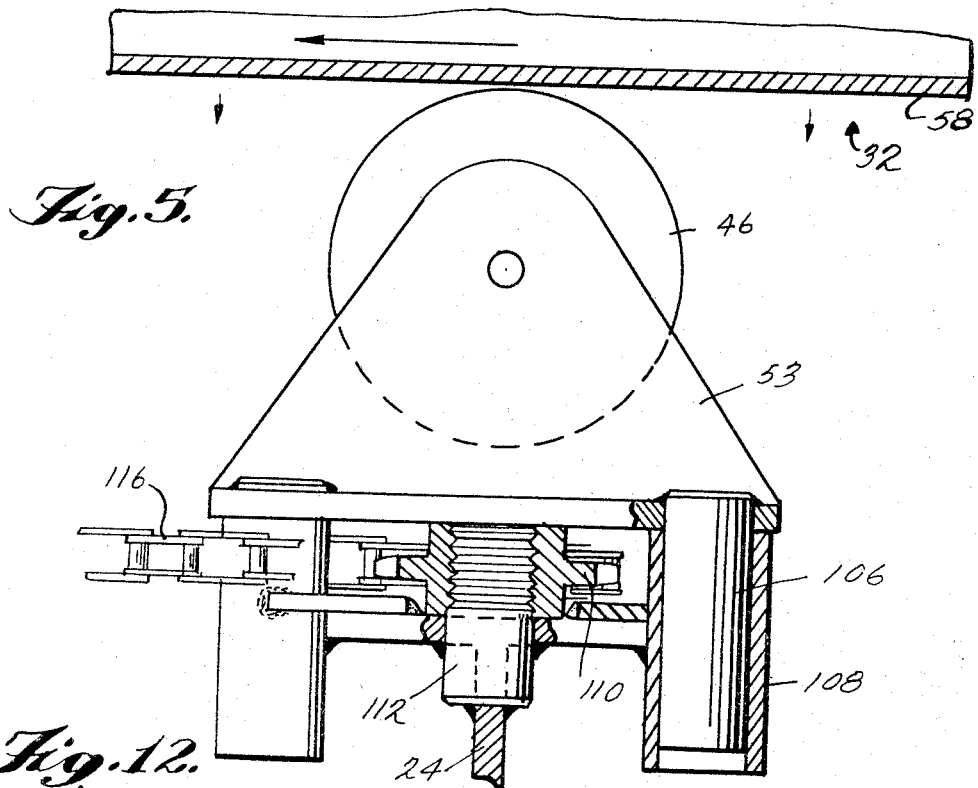
Fig. 5.
Fig. 12.
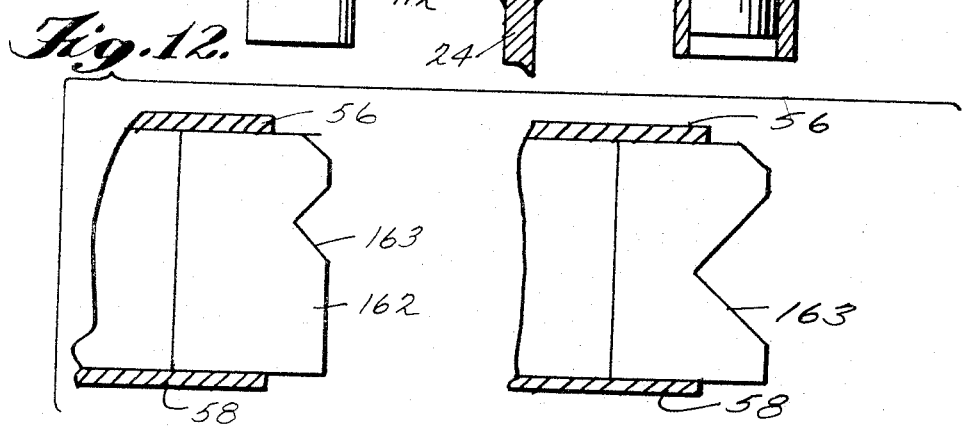
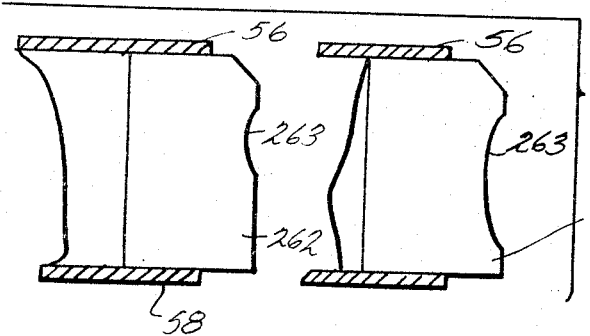
Fig. 13.

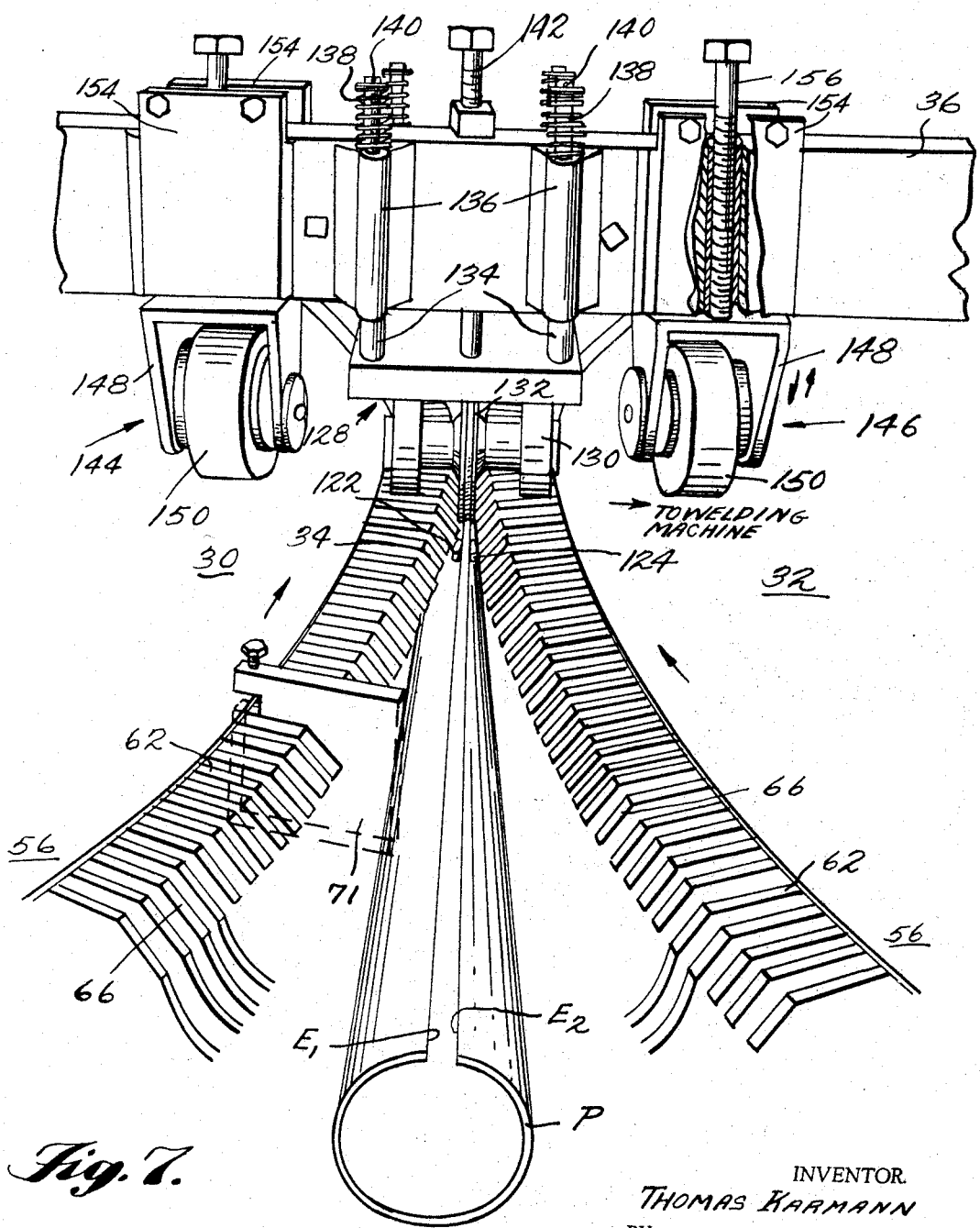

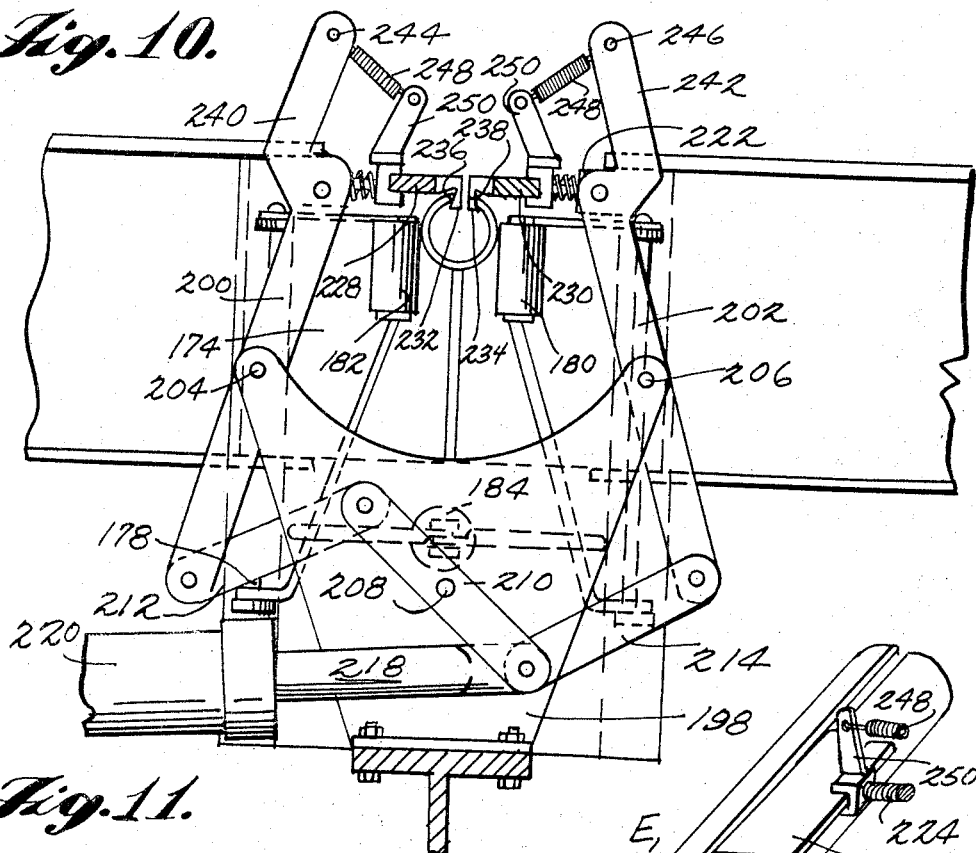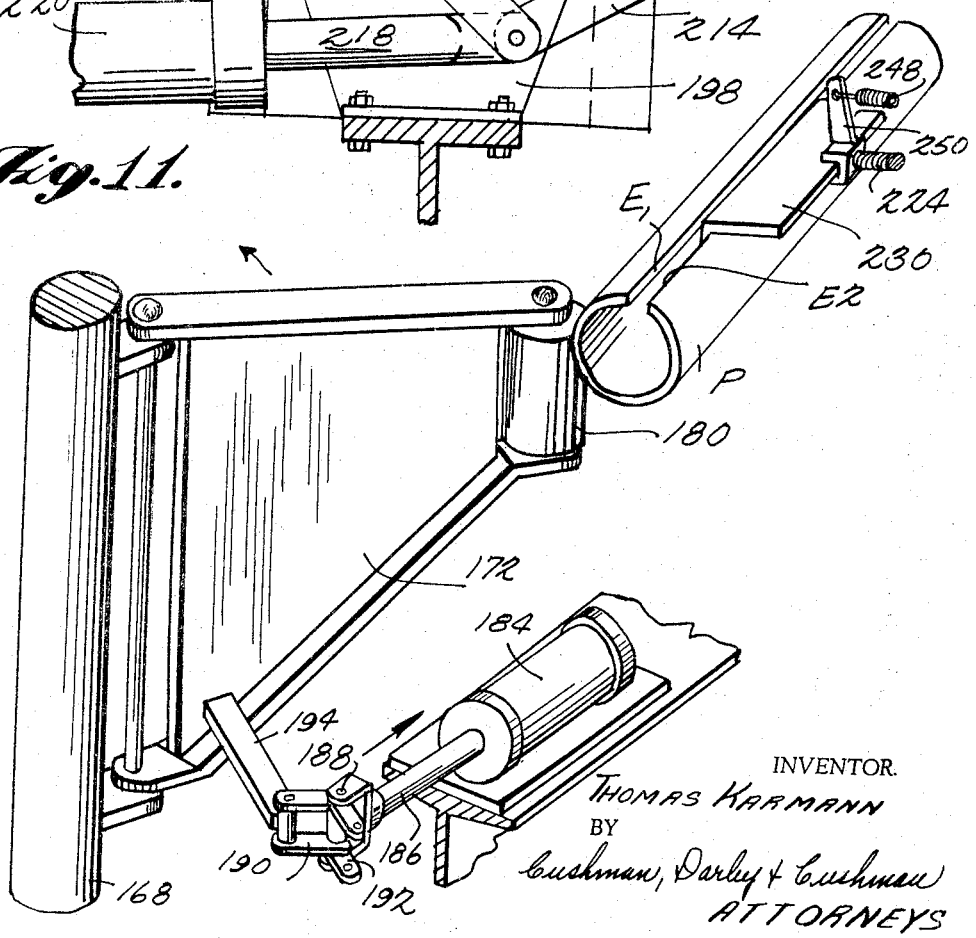

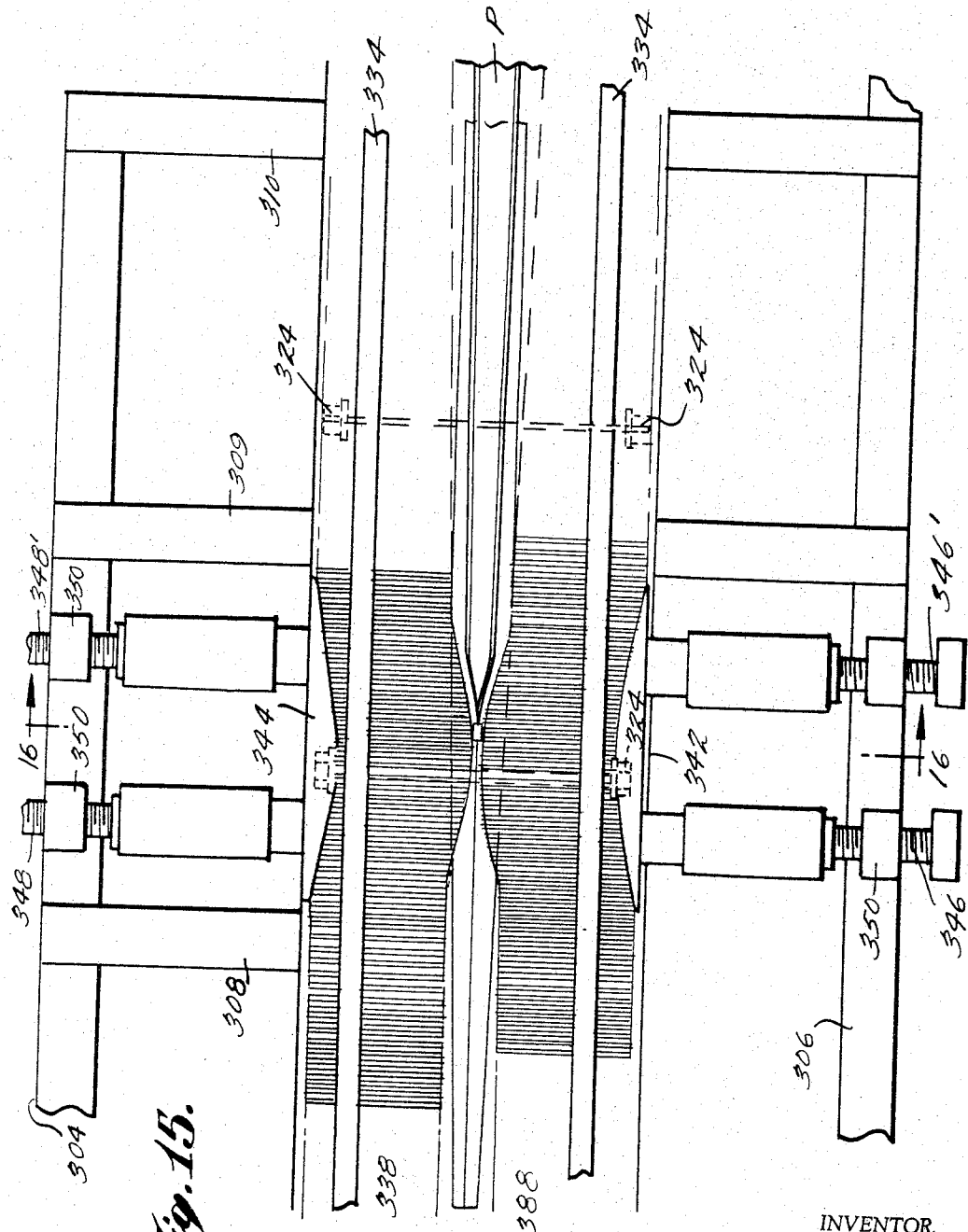

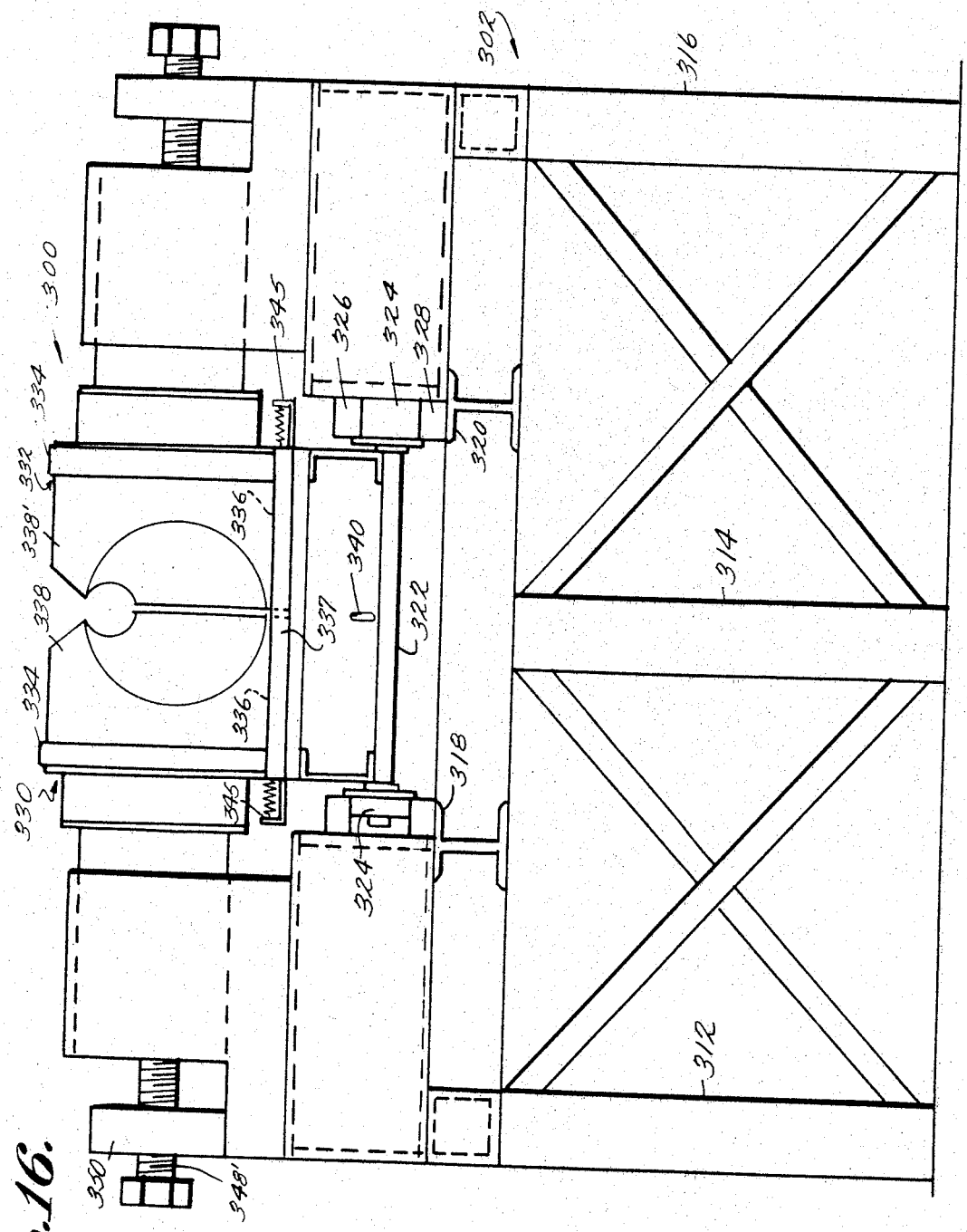

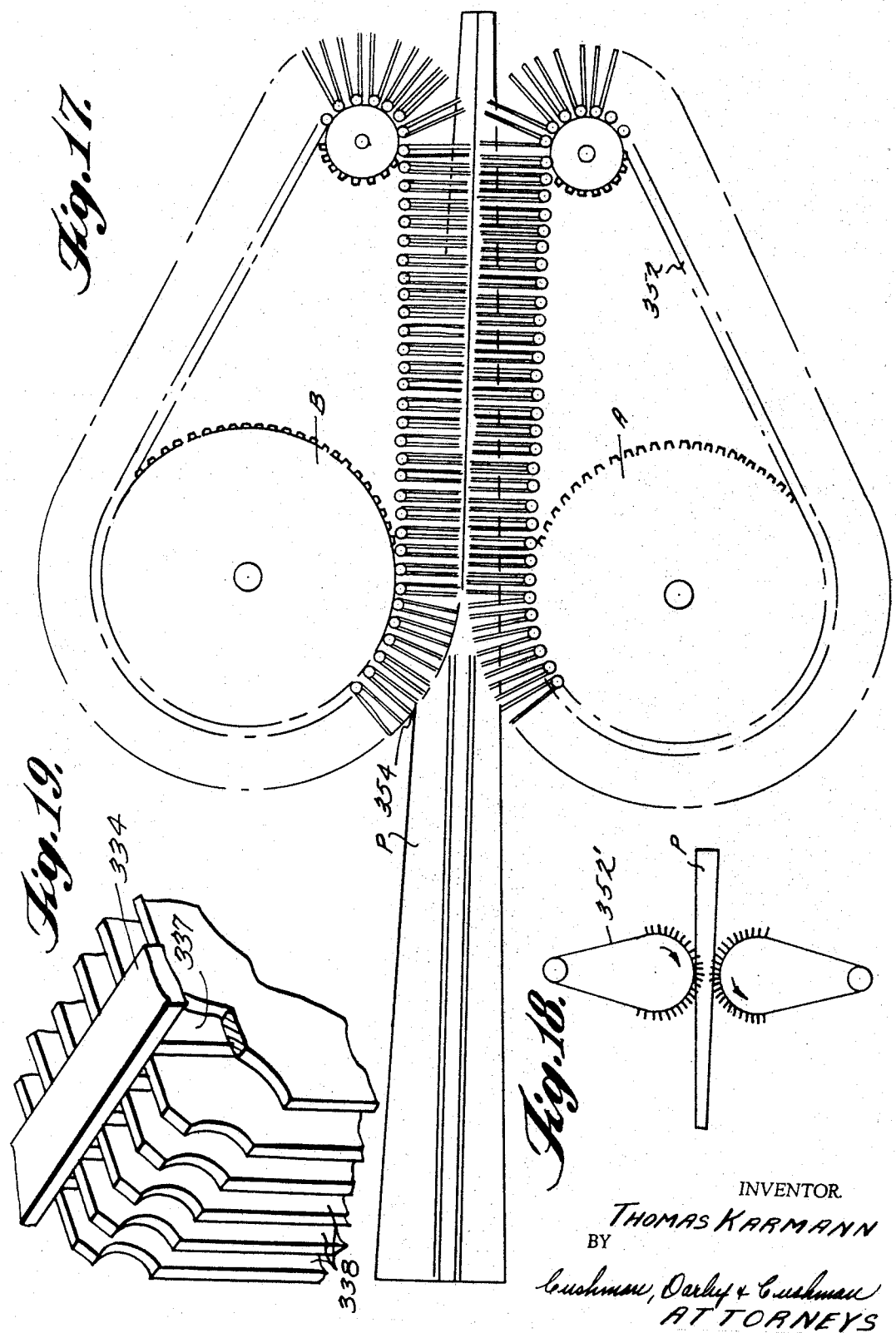

United States Patent Office 3,329,329
Patented July 4, 1967

3,329,329
WELDING TAPERED PIPE
Thomas R. Karmann, Omaha, Nebr., assignor to Valley Manufacturing Company, Valley, Nebr., a corporation of Nebraska
Filed Apr. 16, 1963, Ser. No. 273,351
19 Claims. (Cl. 228—17)

The present invention relates generally to an improved method and apparatus for welding pipe and, more particularly, the invention relates to welding the closing seam of longitudinally abutting edges of a preformed tapered pipe blank.

According to this invention a preformed plate bent into the approximate shape of a tapered pipe blank is finally shaped and welded along a straight longitudinal edge as the plate passes between feed members having cooperative peripherally arranged work-engaging profiles. These profiles are constructed and arranged to engage and to apply radial compression to the tapered form and feed the same through a welding station. To this end the feed members are provided with work-engaging profiles of progressively varying size. Further, means are provided for insuring that the longitudinal matching edges of the pipe are properly aligned as the preformed plate is fed past a high frequency welding machine mounted at the welding station.

In the preferred form of my invention the feed members having cooperative peripheral work-engaging profiles constitute large wheel-like members. However, the peripheral work-engaging profiles may be constructed and arranged in other ways as typically shown by modifications disclosed herein.

Therefore, an object of the present invention is to provide an improved method and apparatus for continuously forming tapered structures of substantial length and of varying cross sectional shapes, such as flag poles, street-light poles and the like.

A further object of my invention is to provide an improved method of forming tapered pipe or the like including the steps of: forming a metal plate into a longitudinally tapered tubular blank with the opposed edges of the plate disposed in a straight-line adjacent relationship; feeding the tubular blank in an axial direction between opposed feed members having cooperative peripheral profiles to feed and finally compress the blank; aligning the opposed edges of the blank; maintaining the blank in alignment with the feed members and continuously welding blank edges together during movement of the same through said feed members.

A further object of the instant invention is to provide an apparatus for continuously welding tapered pipe shapes including cooperative feed members, welding means, means for guiding substantial pipe lengths between the feed members in such a manner that the matching surfaces to be welded are maintained in a vertical plane passing through the pipe axis.

Another object of the present invention is to provide an apparatus for finally compressing and feeding a tapered tubular pipe blank through a welding station including means for maintaining the pipe in proper vertical and horizontal alignment.

A still further object of the present invention is to provide a new and improved method and apparatus for welding longitudinal tapered pipe in a notably efficient, reliable and commercially acceptable manner.

These and still further objects, advantages and novel features of the present invention will become apparent in the specification and claims, taken in connection with the accompanying drawings.

In the drawings:

FIGURE 1 is a plan view of the preferred apparatus according to this invention;

FIGURE 2 is a front elevation view of the apparatus in FIGURE 1;

FIGURE 3 is a detail section view taken along line 3—3 in FIGURE 1;

FIGURE 4 is a detail section view taken along line 4—4 in FIGURE 1;

FIGURE 5 is a detail view of a roller support for one of the feed wheels adjacent the welding station in the apparatus of FIGURE 1;

FIGURE 6 is a sequence view showing the pipe-gripping plates carried by the feed wheels of the preferred apparatus;

FIGURE 7 is a perspective view of the welding station of the apparatus of FIGURE 1;

FIGURE 10 is a detail view of a part of the guiding mechanism, taken along line 10—10 in FIGURE 1;

FIGURE 11 is a perspective detail view of a portion of the lateral guiding mechanism for the tapered pipe shown in FIGURE 9;

FIGURE 12 is a diagrammatic detail view of a modified feed-wheel plate construction adapted to accommodate square or rectangular pipe shapes;

FIGURE 13 is a view similar to FIGURE 12, but showing modified feed-wheel plates adapted for accommodating oval or elliptical pipe shapes;

FIGURE 15 is a plan view showing a modification wherein the work-engaging members are arranged in parallel, opposed and cooperating relation;

FIGURE 16 is a sectional view taken along line 16—16 in FIGURE 15;

FIGURE 17 is a view of a further modification wherein the work-engaging feed members are carried by an endless conveyor mechanism and the work-engaging profiles have extensive contact with the work;

FIGURE 18 is a modification of the apparatus of FIGURE 17 wherein the work-engaging profiles have limited contact with the work; and FIGURE 19 is a detailed view in perspective showing details of the supporting racks for the work engaging members of FIGURE 15.

Figure 8:
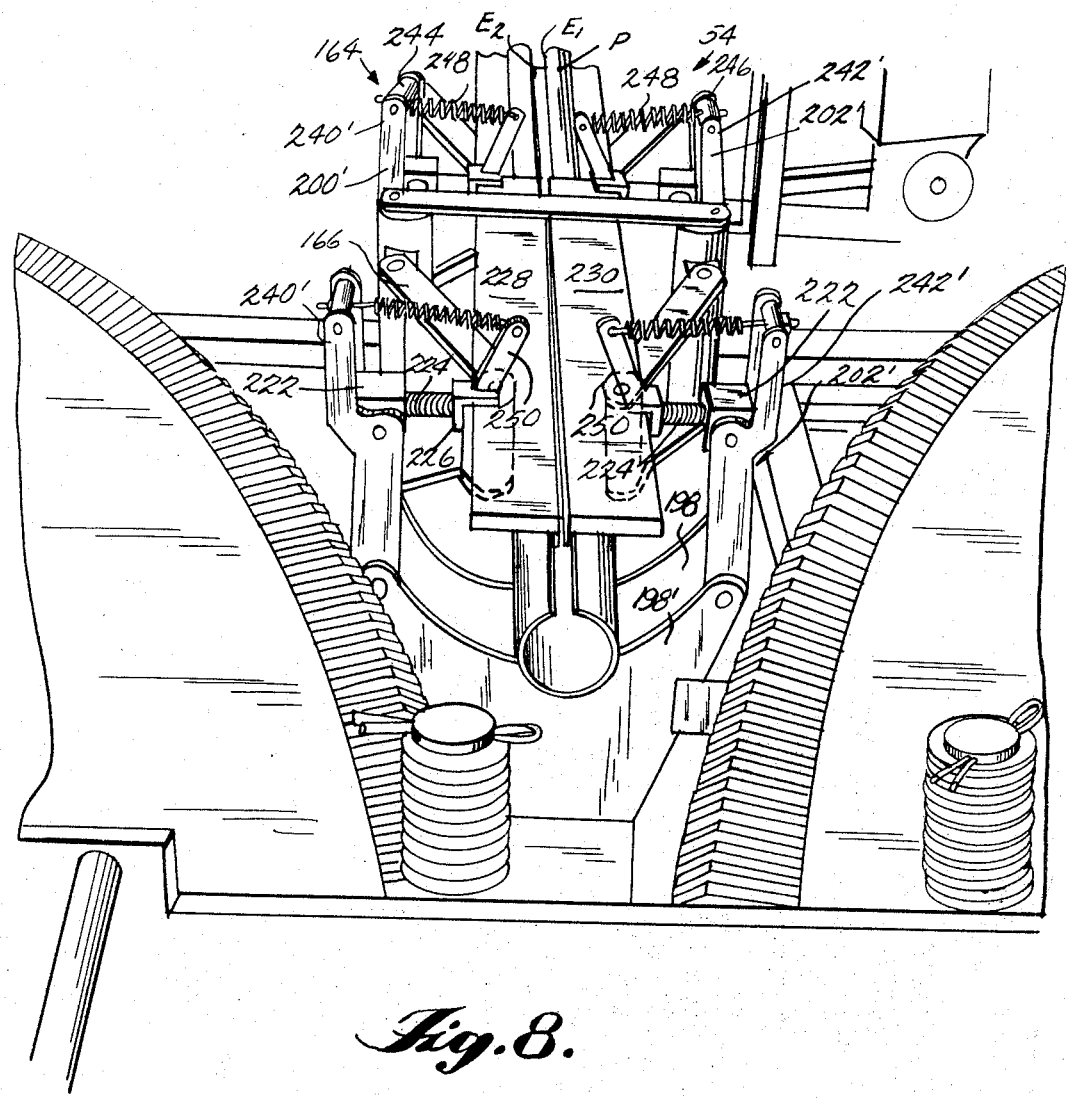
FIGURE 8 is a perspective view of the guiding mechanism for the tapered pipe as viewed from the welding station shown in FIGURE 7.

The apparatus illustrated in FIGURES 1 through 14 show the perferred form of the invention, and FIGURES 15, 16 and 19 illustrate a first modification wherein the work-engaging feed members are disposed in parallel, opposed and cooperating relation. In FIGURES 17 and 18 still further modified arrangements are shown of the apparatus for carrying the work-engaging profiles into feeding and shaping or compressing relation with the tapered pipe.

*Preferred form—General arrangement*

Referring first to FIGURES 1 and 2, there is shown the overall arrangement of the preferred form of the apparatus 10, having a generally rectangular structural frame 12 formed of I-beams and adapted to support the apparatus 10 on the ground or similar supporting surface. The frame 12 conveniently includes opposed side frame members 14, 16 joined together by opposed end-frame members 18, 20 and a perpendicularly intersecting intermediate-frame formed of members 22 and 24. The member 24 extends well beyond the end-frame members 18 and 20. Mounted at the intersection of the end-frame members 18, 20 and the intermediate-frame member are upstanding bearing posts 26, 28, respectively. These bearing posts carry large feed wheels 30, 32, respectively, defining at their intermediate space along a line through the bearing posts, a welding station 34. An expansible structural member 36 is joined to the opposed bearing posts 26 and 28 above the feed wheels 30, 32 for reasons to become evident. Moreover, the feed wheels 30, 32 are supported for rotation by upstanding roller bearing assemblies spaced near the bottom periphery of the feed wheels 30, 32 and mounted on the frame 12. In this regard, FIGURES 1 and 2 show the feed wheel 30 supported at 90° angular positions by roller bearing assemblies 38, 40, 42, 44, respectively, while the feed wheel 32 is supported by symmetrically opposed roller bearing assemblies 46, 48, 50 and 52. These roller bearing assemblies are all of conventional construction, preferably taking the form of a bracket plate 53 carrying a roller bearing at its upper end.

There are provided guide mechanisms 54 generally adapted to feed a tapered pipe P with opposed longitudinal edges $E_1$, $E_2$ facing upwardly between the feed wheels 30, 32 and through the welding station 34 as the feed wheels 30, 32 are rotated in unison in cooperatively oriented relationship to weld the pipe along a longitudinal line defined by the edges $E_1$, $E_2$. Consideration will now be given to the various subassemblies of the preferred form of my invention.

*The feed wheel assemblies*

As shown in FIGURE 3, the feed wheel assemblies 30, 32 are of identical construction and take the form of circular upper and lower plates 56, 58, the lower plate 58 carrying a peripherally depending flange 60 defining a drive sprocket presently described.

In order to effectively compress and feed the tapered pipe P through the welding station 34, the peripheral surface of each feed wheel 30, 32 is constructed and arranged to accommodate and guide the continuously varying cross-sectional size of the pipe P. To this end, plates 56 and 58 carry therebetween radially extending plate-like members 62 joined as by welding in endwise relationship to the plates 56 and 58 so that their outer edge surfaces each constitutes a pipe-gripping or work-engaging profile. The thickness of the members 62 and their spacing along the corcumferential distance of the wheels may be varied in accordance with the structural nature of the tapered pipe. Preferably, these members are spaced very close to one another and several hundred might be required, by way of example, for a feed wheel having a circumferential distance of, say, 40 feet. Larger or smaller feed wheels may be employed to accommodate desired lengths of tapered pipe.

Bearing in mind that the pipe P is formed of progressively increasing cross-sectional area from one end to the other, the work profiles of the guide members 62 are successively larger so that they will also be able to accommodate and grip such a configuration. Moreover, it is desirable to have the uppermost extent of the pipe P (where the edges $E_1$, $E_2$ are located) at a constant elevation. The work-engaging profiles of the plate-like guide members 62 are successively enlarged in the manner shown, for example, in FIGURES 4 and 6, wherein, starting with a point on the plates 56, 58, the first member 62a has a segmental circular profile 63a. The next member 62b has a circular profile 63b slightly larger and so on around the circumference until the cut-out portion 63x of the final member 62x which would be immediately adjacent the member 62a. The outer end surface 64 of these plates 62 are vertical up to the cut-out portion 63; however, the profile portions do not define complete semicircles in view of the fact the feed wheels are not really positioned tangent to one another but are slightly spaced apart. In each of the plate-like members, the work-engaging profile begins at the bottom extent of the angular taper 66. Thus, it will be appreciated that as the pipe P is fed between these cut-out portions 63, the upper surface of the pipe remains at a constant elevation with the differences in size being accommodated below this constant elevation.

When these feed wheels 30, 32 are angularly oriented in cooperative relationship, two opposed members 62 define gripping surfaces for the pipe P as it is moved therebetween, and the pipe is thereby bent or compressed to its final shape in preparation of the welding operation at the welding station 34.

Referring to FIGURE 7, in normal operation of the apparatus tapered tubular pipes are formed utilizing the entire peripheral surface of the feed wheels 30 and 32. When it is desired to form pipe lengths of less than the entire peripheral distance of the feed wheels, a plate 71 removably positioned on the peripheral surface of wheel 30 provides a starting point for the feeding operation of these shorter lengths of pipe. Obviously, the operator will place the plate 71 at a point on the peripheral surface of wheel 30 as determined by the size and particular profile of the pipe blank.

The circumferential flange 60 below the plate 58 carries sprocket teeth 68 via which synchronous rotary drive is imparted to the feed wheels 30, 32. To this end, a sprocket drive chain 70 (FIGURE 1) is trained about approximately three-fourths of the feed wheel 32, thence about a cooperative one-fourth of the feed wheel 30 where it is joined to a sprocket drive wheel 72 and a suitable prime mover and reduction gear assembly 74 of a conventional and well-known construction. Conveniently, this prime mover 74 is a variable speed drive so as to allow regulation of the rotary speed of the feed wheels 30, 32 and consequently the speed with which the tapered pipe P moves through the welding station 34.

*Preferred form—Feed wheels adjustment*

In view of the very large size which the feed wheels 30, 32 may assume, it is not unlikely that slight variations might occur during fabrication which might detract from reliable commercial utility of the machine. Moreover, mere tolerances in machining of the elements may cause incremental variations. Therefore, proper alignment of the feed wheels and adjustment of the cooperative relationship may be desirable. To this end, various means for providing incremental adjustment of the large feed wheels 30, 32 are provided for so as to insure as accurate as possible feed of the pipe P.

Figure 14:
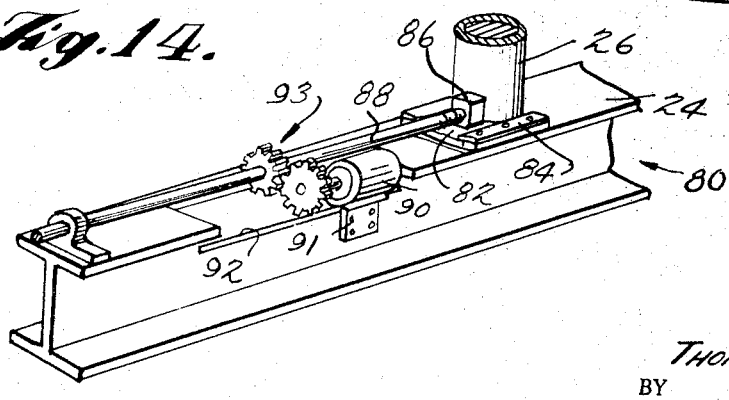
FIGURE 14 is a perspective detail view for the feed-wheel adjusting mechanism shown in FIGURE 2.

The first adjusting means, as shown in FIGURES 1, 3 and 14, constitutes a mechanism 80 for moving the feed wheel 30 towards and away from the feed wheel 32 along the line extending between the upright axes of these feed wheels. To this end, the bottom of the bearing post 26 of the wheel 30 is mounted on a supporting plate 82 which is, in turn, mounted for movement on ways 84 in the manner just described. The lower end of this post 26 carries an internally threaded block 86 which is axially oriented with respect to the opposite bearing post 28.

Figure 9:
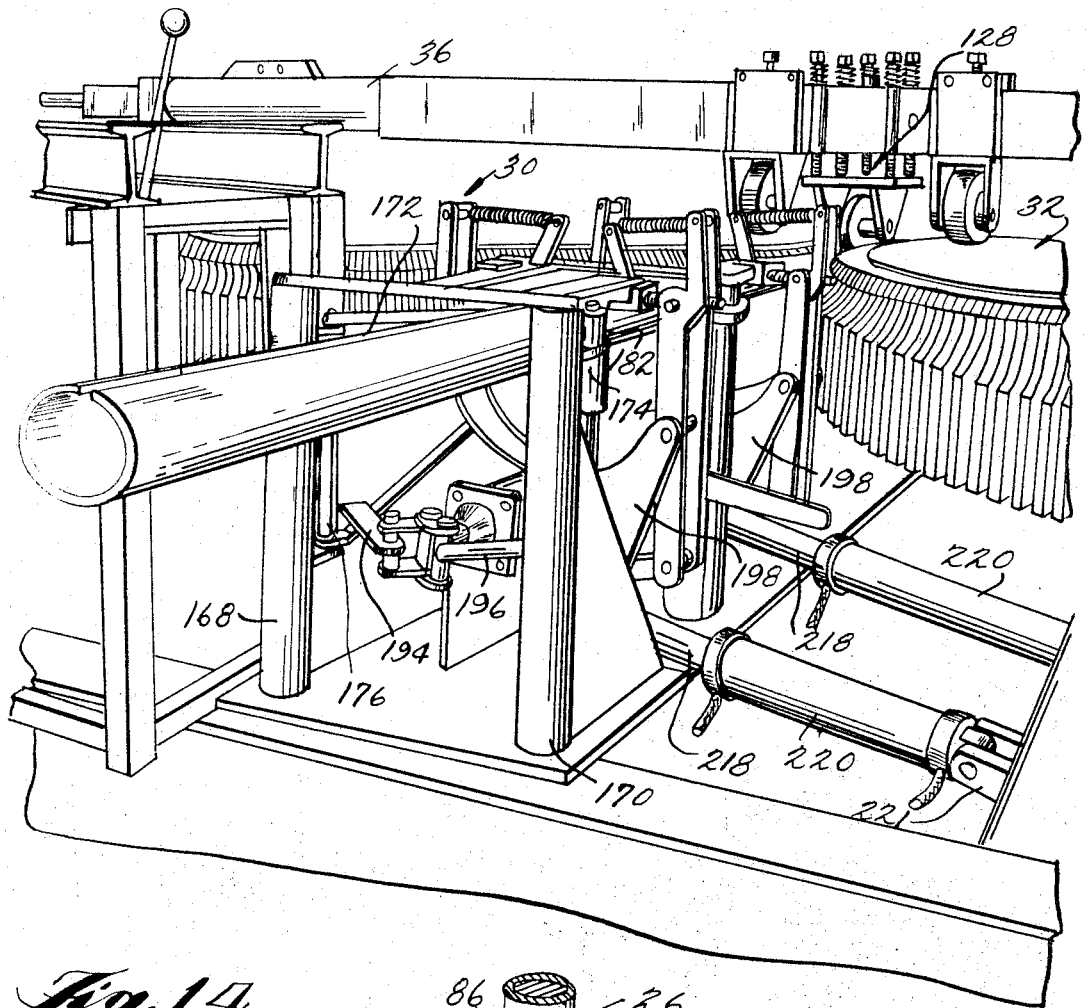
FIGURE 9 is a perspective view of the guiding mechanism viewed in a direction opposite to that shown in FIGURE 8.

Referring particularly to FIGURES 2, 9 and 14, a long shaft 88 is threadably engaged with the block 86 so that rotation of the shaft 88 moves the post 26 back and forth on the ways 84 depending on the direction of rotation. As indicated in FIGURE 2, the shaft 88 must be restrained against axial movement and for this purpose an upright journal bracket frame 89 is provided, including a conventional thrust bearing unit generally designated 85. Preferably, the shaft 88 is rotated in both directions by drive means 90 including gearing 93 and a remotely controlled reversible motor. A bracket plate 91 is joined to the frame member 24 for supporting the drive means 90, and the frame member 24 has a cutout portion 92 as necessary to accommodate the latter. The upper end of post 26 is mounted for movement in synchronism with the supporting plate 82, and to this end, a shaft 94 is carried in the journal frame 89 above the wheel 30. The shaft 94 is threadably received in a block 100 after the manner of shaft 88 and block 86. Synchronous rotation of shafts 94 and 88 is effected through a sprocket chain 98 and sprocket wheels 93 and 96, respectively, carried on shafts 88 and 94. This arrangement balances the force on the post 26 when adjustment is required and otherwise prevents the post from binding in the ways 84. Thus, the feed wheel 30 is movable in incremental fashion towards and away from the feed wheel 32 to provide close adjustment of this distance between the two feed wheels 30, 32 at the welding station 34.

A second adjustment comprising mechanism 102 and 104 is provided, shown generally in FIGURE 1, to effect horizontal alignment of feed wheels 30 and 32, and FIGURES 4 and 5 illustrate these mechanisms in further detail. As these mechanisms are identical, description of details will be confined to that of mechanism 104, and it will be understood that mechanism 102 operates on feed wheel 30 while the mechanism 104 operates on the feed wheel 32. The bracket 53 for the roller bearing 46 is mounted for vertical movement by aligning studs 106 carried in fixed sleeves 108. An internally threaded sprocket wheel 110 is confined between the bracket plate 53 and the top of the frame member 24. This sprocket wheel 110 is threadably engaged with an upwardly extending fixed stub shaft 112. The frame, in turn, carries a vertically journalled shaft 113 with an aligned sprocket wheel 114 thereon, drive being transmitted between the sprocket wheels 114 and 110 by a sprocket chain 116.

The shaft 113 is manually operable by a handle 118 so that rotation of the handle in one direction raises the roller bearing 46 while rotation in the opposite direction lowers the roller bearing 46. Thus, the elevation of feed wheel 32 is incrementally adjustable to compensate for any misalignment and to provide proper cooperative relation of wheel 32 with respect to wheel 30 and the welding station 34.

The welding station

The welding station 34 illustrated in FIGURES 2, 4, 7 and 9 includes a welding machine 120 of conventional construction, supported on the structural member 36 by supporting beams 121. The welding machine is a high-frequency machine, e.g., manufactured by Thermatool Machine Company of Rochelle, N.Y., and this machine has the usual electrode shoes 122 and 124 which are adapted to be positioned at the welding station near each of the pipe edges $E_1$, $E_2$.

A pressure wheel assembly 128 is carried by the structural member 36 for engagement with the just-welded area of pipe P. This assembly 128 includes depending bracket journals 130 for mounting a peripherally recessed pressure wheel 132 adapted to ride over the weld metal. This bracket is resiliently supported by upwardly extending mounting bolts 134 which pass freely through vertical collars 136 on the structural member 36. These sleeves are spring-loaded, carrying compression springs 138 confined between the upper end of the structural end 136 and the bolt heads 140.

Moreover, the structural member 36 carries a depending threaded bolt 142 biased against the top center of the bracket 130 to limit upward movement of the bracket 130, as desired. The pressure wheel 132 is conventionally journalled in the bracket plate 130 at its opposed ends with suitable roller bearings (not shown).

Spaced on opposite sides of the depending bracket 130 are guide wheel assemblies 144, 146 of identical construction. Each guide wheel assembly includes a depending bracket plate 148 carrying a wheel 150 which rides against the top surface of the feed wheel plate 56. This bracket plate carries opposed upstanding clamping plates 154 which receive the structural member 36 therebetween, and the wheel 150 is vertically adjustable in elevation by a bolt 156 carried by a structural member 36 in an interiorly threaded fixed collar 158.

Also, the welding station 34 has a scarfing tool 160 positioned to the rear of the pressure wheel 132. This tool 160 is mounted on the structural member 36 by the bracket plate 162 and is arranged to remove the excess weld material and otherwise clean the longitudinal weld line (FIGURE 4).

The guide mechanism for tapered pipe

The guide mechanism for the tapered pipe includes, first, the guide mechanism comprising a pair of spaced apart rollers 180, 182 constructed and arranged to have symmetrical movement towards and away from the feed axis of the pipe P. This guide mechanism assists in maintaining the pipe properly aligned with respect to welding station 34. The opposed guide rollers 180, 182 are operated by an air cylinder 184 in a manner presently described.

The second guide arrangement includes the plates 228 and 230 having gripping flanges 232 and 234 to tilt and insure accurate guiding of the pipe P edges E and $E_1$ through the welding station 34.

Referring particularly to FIGURES 1 and 8 through 11, the first guide mechanism comprising the rollers 180, 182 provide for lateral shifting of the pipe P to insure proper axial alignment of the pipe as it passes through the welding station 34. As shown in these figures, two sets of guide rollers 180, 182 are provided and generally designated as guiding mechanisms 164 and 166, respectively. These mechanisms are identical in construction and like numerals are used to designate identical elements. For the present purpose, discussion will be limited to the guide mechanism 164.

The guide mechanism 164 includes upright, symmetrically spaced framing posts 168, 170 carrying web plates 172, 174 by pivots pins 176, 178, respectively. These web plates 172, 174 face towards the welding station 34 and carry at their opposite free ends guide rollers 180, 182 which are adapted to engage the side walls of the pipe P. Symmetric movement of these guide rollers 180, 182 towards and away from the feed axis of the pipe P is obtained by manually controlled air cylinder 184 which is aligned with the feed axis of the pipe and mounted on the frame member 22. The piston rod 186 extends outwardly in a direction opposite to the welding station 34 and carries an upright pin 188 at its free end. This pin, in turn, carries oppositely directed links 190, 192. The outside free end of these links carry radius arms 194, 196 in pivotal fashion, while the opposite ends of the arms are joined by welding to the facing surface of the respective web plates 172, 174 in spaced apart relationship to their respective pivot pins 176, 178. It will thus be apparent that the guide rollers 180, 182 are symmetrically movable in unison to accommodate the progressively changing size of the tapered pipe P passed therebetween.

As shown particularly in FIGURES 1, 8, 9, 10 and 11, the second guiding mechanism comprises plates 228 and 230 generally arranged above the outside guiding mechanisms 164, 166. These plates insure upward orientation of the edges $E_1$, $E_2$ of the pipe P. To this end, the frame of this second guiding mechanism comprises two web plates 198, 198' positioned in the region of the lateral guide mechanism 164 and two more web plates 198, 198' positioned in the region of the lateral guide mechanism 166. The construction of these frame members, however, is identical, as will become evident. The web plates 198, 198' each carry a toggle linkage in the form of opposed links 200, 200' and 202, 202', respectively, pivotally connected intermediate their ends to the upper opposed symmetrical extents of the web plates 198, 198' via pivot pins 204, 206, respectively. The web plates 198, 198' at a point symmetric with the pipe-feed axis carry a stationary pivot pin 208 which, in turn, carries a link 210 at the longitudinal mid-point of the latter. One end of the link 210 carries a transition link 212 pivotally connected to the bottom end of the toggle links 200, 200'; the other end of the link 210 carries identical transition 214 which is pivotally connected to the bottom end of the toggle links 202, 202'. Pivotally connected to the pivot joint 216 between the links 214 and 210 is a piston rod 218 of a transversely oriented air cylinder 220, mounted to the frame by a bracket plate 221. As the piston rod 218 thus moves outwardly, the upper ends of the toggle links 200, 200' and 202, 202' move in tilting fashion together transversely of the axis of the pipe P. Conversely, as the piston rod moves inwardly, the toggle links 200, 200' and 202, 202' move outwardly.

The upper ends of the toggle links 200, 200' and the opposed toggle links 202, 202' carry a pivotally mounted block 222 which, in turn, carries a threaded stud 224 perpendicular to the pivot connection with the respective toggle links. The inner extent of each stud 224 (adjacent the pipe P) carries a short angle plate 226 (FIGURE 8).

Bearing in mind that these two identical sets of toggle links 200, 200' and 202, 202' are longitudinally spaced from one another, these angle plates 226 (two on each side of the pipe-feed axis) carry long guide plates 228, 230, respectively, in facing relationship. These guide plates 228, 230 have depending adjacent pipe-gripping flanges 232, 234, having inwardly bevelled surfaces 236, 238, respectively, to securely engage the pipe edges $E_1$, $E_2$. Inasmuch as the opposed blocks 222 which carry the plates 228, 230 are pivotally connected to their toggle links, these guide plates are maintained in a generally horizontal position by upstanding parts 240, 240' and 242, 242', respectively, joined to the upper extent of the respective toggle links 200, 200' and 202, 202'. These parts each carry a pin 244, 246, respectively, therebetween, the pins, in turn, each carrying a tension spring 248 which is joined to an aligned angle plate 226 via an upstanding bracket plate 250 welded thereto.

This arrangement thus allows the pipe-gripping flanges 232, 234 to tilt together or move away from each other to follow the pipe edges $E_1$, $E_2$ and insure accurate guiding of the pipe P into a welding station 34 with the pipe edges uppermost. Any convenient means (not shown) is provided for manual operation of the two air cylinders 220, 220' by the attendant, such operating means being simply a control valve well known in the art.

In operation, the pipe P is fed through the guiding mechanism 54 where it is engaged by the two sets of guide rollers 180, 182. The guide plates 228, 230 are manually controlled to follow the pipe edges $E_1$, $E_2$ and to insure that they are oriented uppermost.

The symmetrically opposed feed wheels 30, 32 are driven by the sprocket drive chain 70 so as to grip the pipe walls with the progressively increasing cutouts 63 or profiles in the peripheral plates 62. Welding is accomplished by the electrode shoes 122, 124 and the longitudinal weld line passes beneath the pressure wheel assembly 128 and the scarfing tool 160, then out of the opposite side of the welding station 34.

While the invention has been disclosed as being adapted for welding tapered pipes of the usual circular configuration, it will be evident that other pipe shapes may be welded. Referring to FIGURE 12, plates 162 are shown with right-angle profiles 163 adapted for engagement with square or rectangular pipe shapes as may be found desirable in street light pole constructions and the like. In FIGURE 13, plates 262 are shown with oval or elliptically shaped profiles 263. Still further shapes will be advantageously welded according to the principles of this invention.

*First modification*

FIGURES 15 and 16 show an alternate arrangement for mounting the spaced apart feed members constituting a first modification wherein the individual profiles of progressively varying size are carried in two parallel opposed cooperating groups.

This form of apparatus generally designated by numeral 300 is provided with a frame 302 comprising longitudinally spaced apart and substantially parallel side members 304, 306 joined to transversely arranged frame members 308, 309 and 310. These side and transversely extending frame members are supported at a convenient height by a plurality of interbraced leg units, such as 312, 314 and 316, as shown in FIGURE 16. A pair of parallel rail members 318 and 320 are built into the upper surface of frame 302 and constitute a railway for a carriage 322 having a plurality of wheels 324. It will be noted that the rail units 318 and 320 provide upper control surfaces 326 and lower supporting surfaces 328 confining movement of the carriage to longitudinal straight-line motion along the railway.

The carriage 322 is of substantial length and will be somewhat longer than the lengths of the pipe to be welded. The carriage is provided with laterally spaced rack units 330 and 332 disposed longitudinally thereof as shown in FIGURE 19. The rack units 330, 332 are identical in construction and each comprise a longitudinally extending upper member 334 and a longitudinally extending lower member 336. The ends of these rack units are provided with transversely extending tie members 335. Each rack is provided with a series of vertically disposed and spaced apart spacing bars 337 providing pockets adapted to receive transversely movable plate members 338, 338' having work-engaging profiles of progressively varying size for engaging the taper tubular pipe blank. The carriage 322 may be moved longitudinally of the frame 302 by any suitable means such, for instance, as a cable attached to connection 340.

The frame 302 also carries a pair of spaced apart inwardly disposed cam units 342, 344 which engage the outer edge of the plate-like feed members and guide these members inwardly into shaping and feeding engagement with the pipe P. Springs 345 are connected to the outer lower corner of each plate 338, 338' to maintain the plates away from engagement with the pipe P except during actual feeding and compressing operation.

These cam members 342, 344 are each provided with threaded adjusting means 346, 346' and 348, 348', respectively having threaded engagement with internally threaded block units 350 suitably supported on the side frame members 304 and 306. These threaded adjusting means permit the cam units 342, 344 to be adjustably positioned in opposed cooperative relation with respect to the tapered pipe being welded.

This modified apparatus is provided with a welding station at a position between the cam units 342, 344 after the manner illustrated in the preferred form of the invention.

Furthermore, the pipe aligning and guiding mechanisms described in connection with the preferred embodiment may, of course, provide similar functions in connection with this first modified form of my invention.

In operation, the preformed tapered tubular pipe blank is axially positioned within the recess formed by the opposed feed members and the carriage 322 is pulled past the welding station. During movement of the carriage past the welding station and the opposing cams 342, 344 of each individual plate 338, 338' will be pushed into shaping and feeding engagement with the tapered pipe.

*Second modification*

This form of the apparatus illustrated in FIGURES 17 and 18 illustrates the arrangement of the spaced apart feed members in an endless flexible chain 352. The opposed chain-type feed members are trained over a pair of spaced apart sprocket gears and the sprocket gears are arranged to present a substantial length of the feed member for engagement with the tubular pipe passing through the welding station.

In FIGURE 17 the large sprocket wheels A and B are arranged with substantially parallel axes. A welding station 354 is located adjacent a line drawn through these axes and near the peripheral surface of the endless flexible feed members.

It will be understood that the guiding mechanism illustrated in the preferred form of the invention may be utilized with the feed members illustrated in FIGURE 17 as well as with the feed members illustrated in FIGURE 18.

In FIGURE 18 a further arrangement of endless flexible feed members 352' is illustrated wherein the axes of all of the sprocket wheels are vertically disposed and are arranged in a line normal to the axis of tubular pipe blank P. In this arrangement the work-engaging profiles have engagement with the pipe throughout a relatively short distance on its travel.

From the foregoing descriptions of the various embodiments of this invention, it is evident that the objects of this invention, together with many practical advantages are successfully achieved. While preferred embodiments of my invention have been described, numerous further modifications may be made without departing from the scope of this invention.

Therefore, it is to be understood that all matters herein set forth or shown in the accompanying drawings are to interpreted in an illustrative, and not in a limiting sense.

I claim:

1. Apparaus for welding a straight-line closing seam of the longitudinal abutting edges of a preformed tapered pipe comprising: frame means; welding means associated with said frame means; spaced apart feed members mounted on said frame means and positioned to define a welding station therebetween, said feed members having cooperative peripherally arranged work engaging profiles of progressively varying size constructed and arranged to engage the tapered tubular pipe blank and feed the same in an axial direction past the welding station and a starting plate adjustably and removably positioned along one of said spaced apart feed members.

2. An apparatus for welding a straight line closing seam of the longitudinal abutting edges of a preformed tapered pipe blank comprising in combination: a fixed frame means; welding means associated with said frame means; a pair of laterally spaced parallel bearing post means carried by said frame, said bearing post means being movable laterally relative to one another; a feed wheel means rotatably carried by each of said bearing post means in a common horizontal plane; a plurality of radially extending circumferentially spaced plate-like members having outer edges defining pipe-engaging profiles fixed to the periphery of each of said feed wheel means, the profile of each successive plate-like member on each of said feed wheels progressively varying in size along the periphery of each of said feed wheels so as to define, between successively opposed plate-like members, a progressively tapering pipe receiving space corresponding to the longitudinally varying size of the tapered pipe to be welded upon coordinated rotation of said feed wheels and means for continuously guiding the pipe so that the abutting longitudinal edges thereof will be operatively aligned with said welding means as the pipe is fed axially thereby.

3. Apparatus as defined in claim 2 wherein said welding station includes a pressure wheel to bias the opposed edges of said pipe blank toward one another into said straight line closing seam.

4. Apparatus for welding a straight-line closing seam of the longitudinally abutting edges of a preformed tapered pipe comprising: frame means, welding means associated with said frame means; spaced apart feed members mounted on said frame and positioned to define a welding station therebetween, said feed members having cooperative work-engaging profiles of progressively varying size constructed and arranged to successively engage the tapered pipe and feed the same in an axial direction past the welding station; and guide means, including transversely expansible opposed roller guide means operative to receive and to guide the pipe therebetween as the same is axially fed through said welding station, to maintain said tapered tubular pipe axially aligned with said welding station.

5. Apparatus as defined in claim 4 including means for moving said spaced apart feed members towards and away from one another to vary the size of the pipe-receiving space defined by opposed pipe-engaging profiles at said welding station and thereby control the radially inward compression pressure on the pipe.

6. Apparatus as defined in claim 4 wherein the roller guide means includes a fluid cylinder axially oriented to the path of movement of said pipe and linkage means connecting said fluid cylinder to said roller means to provide movement of said roller means towards and away from one another.

7. Apparatus as defined in claim 2 wherein said guide means includes vertically depending flange means engageable with the longitudinal opposed edges of said preformed pipe for tilting said edges to an upwardly directed position.

8. Apparatus as defined in claim 2 including chain sprocket drive means operative to rotate said feed wheel means in cooperative relationship.

9. Apparatus as defined in claim 2 wherein the pipe-engaging profiles of the plate-like members are cooperatively formed to feed a pipe of circular cross-sectional shape therebetween.

10. Apparatus as defined in claim 2 wherein the pipe-engaging profiles of the plate-like members are cooperatively formed to feed a pipe of polygonal cross-sectional shape therebetween.

11. Apparatus as defined in claim 2 wherein the pipe-engaging profiles of the plate-like members are cooperatively formed to feed a pipe of generally oval cross-sectional shape therebetween.

12. Apparatus as defined in claim 2 wherein the pipe-engaging profiles of the pipe-like members are cooperatively formed to feed a pipe of rectangular cross-sectional shape therebetween.

13. Apparatus as defined in claim 4 wherein the spaced apart feed members having cooperative work-engaging profiles of progressively varying size each comprise a plurality of plate units operatively connected to form a flexible endless feed member.

14. Apparatus as defined in claim 13 wherein each flexible endless feed member includes chain links and a pair of spaced apart sprocket means support said flexible endless feed member.

15. Apparatus as defined in claim 4 wherein the spaced apart feed members having cooperative work-engaging profiles of progressively varying size are arranged in two parallel opposed cooperative groups movably supported for longitudinal movement in a direction parallel to the axis of the pipe and stationary cam means are provided to move said feed members inwardly to engage the tapered tubular pipe blank.

16. Apparatus for welding a straight-line closing seam of the longitudinally abutting edges of a preformed tapered pipe comprising: frame means, welding means associated with said frame means; spaced apart endless feed members mounted on said frame means and positioned to define a welding station therebetween, said welding means being disposed above said feed members and said feed members having cooperative peripherally arranged work-engaging profiles of successively and progressively varying size corresponding to the longitudinally varying size of the tapered pipe to be welded and constructed and arranged to successively engage and radially inwardly compress the tapered tubular pipe blank so as to urge the longitudinal edges thereof into abutment and feed said pipe with said edges uppermost and at a constant elevation; and guide means for continuously guiding the pipe so that the abutting longitudinal edges thereof will be operatively aligned with the welding station as they pass thereby, said guide means including opposed guide plate means adapted to engage the edge surfaces of said tapered pipe; a toggle linkage connected to said guide plate means and having an axis aligned with the direction of axial pipe feed of the endless feed members adapted to move said guide plate means to effect tilting and fluid cylinder means for positively actuating said toggle linkage.

17. Apparatus as defined in claim 2 including means for varying the elevation of the feed wheel means relative to one another.

18. Apparatus as defined in claim 4 wherein the feed members comprise feed wheel means rotatably carried by the frame means and the work-engaging profiles comprise a plurality of radially extending circumferentially spaced plate-like members fixed to the periphery of each of said feed wheel means.

19. Apparatus as defined in claim 1 wherein the feed members comprise feed wheel means rotatably carried by the frame means and the work-engaging profiles comprise a plurality of radially extending circumferentially spaced plate-like members fixed to the periphery of each of said feed wheel means.

References Cited

UNITED STATES PATENTS

| | | | |
|---|---|---|---|
| 1,124,755 | 1/1915 | Lloyd | 228—49 |
| 1,124,758 | 1/1915 | Lloyd | 228—44 |
| 1,124,764 | 1/1915 | Lloyd | 228—44 |
| 2,087,227 | 7/1937 | Jones | 219—59 |
| 2,992,318 | 7/1961 | Tour et al. | 219—8.5 |
| 3,148,262 | 9/1964 | Hughes | 219—59 |

JOHN F. CAMPBELL, *Primary Examiner.*

CHARLIE T. MOON, *Examiner.*

M. L. FAIGUS, *Assistant Examiner.*